United States Patent [19]

Kawakami et al.

[11] Patent Number: 5,179,646
[45] Date of Patent: Jan. 12, 1993

[54] FRAME PROCESSING SYSTEM CAPABLE OF EXPANDING AND CONTRACTING A FRAME

[75] Inventors: Yasushi Kawakami, Nagoya; Keiichi Hirata, Kuwana; Tomoko Miura, Nagoya; Yoshimi Itagaki, Ichinomiya; Tomohiro Ban, Iwakura; Akihiro Furukawa, Nagoya, all of Japan

[73] Assignee: Brother Kogyo Kabushiki Kaisha, Nagoya, Japan

[21] Appl. No.: 809,243

[22] Filed: Dec. 18, 1991

Related U.S. Application Data

[63] Continuation of Ser. No. 616,809, Nov. 19, 1991, abandoned, which is a continuation of Ser. No. 329,410, Mar. 27, 1989, abandoned.

[30] Foreign Application Priority Data

Mar. 29, 1988 [JP] Japan ................ 63-75572

[51] Int. Cl.⁵ ............................................. G06F 15/20
[52] U.S. Cl. .................................. 395/145; 395/164
[58] Field of Search ............................. 395/144–149; 340/721, 723, 724, 799

[56] References Cited

U.S. PATENT DOCUMENTS

| | | | |
|---|---|---|---|
| 4,506,343 | 3/1985 | Shipp, Jr. et al. | 364/721 X |
| 4,831,556 | 5/1989 | Oono | 364/521 |
| 4,953,105 | 8/1990 | Hirata et al. | 395/149 |

FOREIGN PATENT DOCUMENTS

| | | |
|---|---|---|
| 58-40679 | 3/1983 | Japan . |
| 60-68473 | 4/1985 | Japan . |
| 60-105076 | 6/1985 | Japan . |
| 60-117377 | 6/1985 | Japan . |

OTHER PUBLICATIONS

Chase and Zager, *Using Microsoft Word*, 1987, pp. 333–357.
Zager and Chase, *Using Microsoft Word*, 2nd Edition, 1987, pp. 11–13, 154–162.
IBM Technical Disclosure Bulletin, vol. 27, No. 10B, Mar. 1985, Cell-Width Determination In A Table (6014).
IBM Technical Disclosure Bulletin, vol. 28, No. 2, Jul. 1985, Method to Provide Variable Heights for Spreadsheet Cells (815).

*Primary Examiner*—Heather R. Herndon
*Attorney, Agent, or Firm*—Oliff & Berridge

[57] ABSTRACT

A frame processing system is capable of expanding and contracting a frame having a plurality of frame lines to define a plurality of areas. One of the areas can be expanded or contracted without expanding or contracting the other areas. One of the frame lines is designated by a cursor, for example, and the designated frame line is moved together with the cursor on the display. At this time, all the other frame lines connected to the designated frame line are automatically expanded or contracted to maintain the connection therebetween.

12 Claims, 10 Drawing Sheets

VERTICAL FRAME LINE POSITION MEMORY 50

| FIRST VERTICAL FRAME LINE POSITION(VP1) | SECOND VERTICAL FRAME LINE POSITION(VP2) | THIRD VERTICAL FRAME LINE POSITION(VP3) | ......... | FINAL VERTICAL FRAME LINE POSITION(VPF) |
|---|---|---|---|---|
| COLUMN x1 FROM LEFT END | COLUMN x2 FROM LEFT END | COLUMN x3 FROM LEFT END | ......... | COLUMN x(FINAL) FROM LEFT END |

FIG.3

FRAME LINE MEMORY 52

| FIRST VERTICAL FRAME LINE DATA(V1) | FIRST HORIZONTAL FRAME LINE DATA(H1) | SECOND VERTICAL FRAME LINE DATA(V2) | SECOND HORIZONTAL FRAME LINE DATA(H2) | THIRD VERTICAL FRAME LINE DATA(V3) | ..... | FINAL VERTICAL FRAME LINE DATA(V(FINAL)) |
|---|---|---|---|---|---|---|
| ON/OFF | ON/OFF | ON/OFF | ON/OFF | ON/OFF | ..... | ON/OFF |

VERTICAL FRAME LINE POSITION MEMORY 50

| VP1 | VP2 | VP3 | VP4 |
|-----|-----|-----|-----|
| 5   | 10  | 19  | 24  |

FIG.6

FRAME LINE MEMORY 52

|             | V1    | H1    | V2    | H2    | V3    | H3    | V4    |
|-------------|-------|-------|-------|-------|-------|-------|-------|
| FIRST LINE  | ON ⓐ  | ON ⓑ  | ON ⓒ  | ON ⓓ  | ON ⓔ  | ON ⓕ  | ON ⓖ  |
| SECOND LINE | ON ⓘ  | ON ⓙ  | OFF ⓚ | ON ⓛ  | ON ⓜ  | ON ⓝ  | ON ⓞ  |
| ⋮           | ON ⓟ  | OFF ⓠ | OFF ⓡ | OFF ⓢ | ON ⓣ  | OFF ⓤ | ON ⓥ  |
| ⋮           | ON ⓦ  | ON ⓧ  | ON ⓨ  | ON ⓩ  | ON ① | ON ② | ON ③ |
| ⋮           | ON ④ | OFF ⑤ | ON ⑥ | OFF ⑦ | ON ⑧ | OFF ⑨ | ON ⓐ  |
| FINAL LINE  | OFF β | ON γ  | OFF δ | ON ε  | OFF κ | ON □  | OFF Ω |

FRAME PROCESSING SYSTEM CAPABLE OF EXPANDING AND CONTRACTING A FRAME

This is a continuation of application Ser. No. 07/616,809 filed Nov. 19, 1991, now abandoned, which in turn is a continuation of application Ser. No. 07/329,410 filed Mar. 27, 1989.

BACKGROUND OF THE INVENTION

The present invention relates to a frame processing system such as a word processor having a display screen on which a frame is displayed, and more particularly to a frame processing system capable of expanding and contracting the frame on the display screen.

In a conventional frame processing system, when a frame displayed on the screen is expanded or contracted, an operator is required to add a line to a frame line constituting the frame or delete a part of the frame line. In the case that inside vertical and horizontal frame lines are formed inside the frame to partition an area inside the frame, such inside vertical and horizontal frame lines are also required to be changed.

There has been proposed in Japanese Patent Laid-open Publication No. 58-40679, for example, a frame processing system wherein vertical and horizontal frame lines constituting a frame can be moved, or the frame itself can be moved. However, this prior art system does not simplify expansion and contraction of the frame. For example, when an operator intends to expand the frame rightwardly, he is required to not only move rightwardly a rightmost vertical frame line but also extend rightwardly upper and lower horizontal frame lines connected to the vertical frame line. In this case, he is further required to precisely move the upper and lower horizontal frame lines so as not to excessively or shortly extend same.

SUMMARY OF THE INVENTION

It is an object of the present invention to provide a frame processing system which can make easy the expansion and contraction of a frame and thereby improve the operability in processing the frame.

According to the present invention, there is provided a frame processing system capable of expanding and contracting a frame, comprising a display device having a screen for displaying said frame; frame expansion/contraction commanding means for commanding expansion or contraction of said frame; frame line designating means for designating a frame line to be moved on said screen for expansion or contraction of said frame; and expansion/contraction processing means for moving said frame line designated by said frame line designating means in a direction different from a longitudinal direction of said designated frame line without changing a length of said designated frame line when a command for expansion or contraction of said frame is supplied from said frame expansion/contraction commanding means to said expansion/contraction processing means, and expanding or contracting other frame lines connected to said designated frame line so as to expand or contract an area inside said frame and adjacent to said designated frame line.

The invention will be more fully understood from the following detailed description and appended claims when taken with the drawings.

DETAILED DESCRIPTION OF THE PREFERRED EMBODIMENTS

Figure 1:
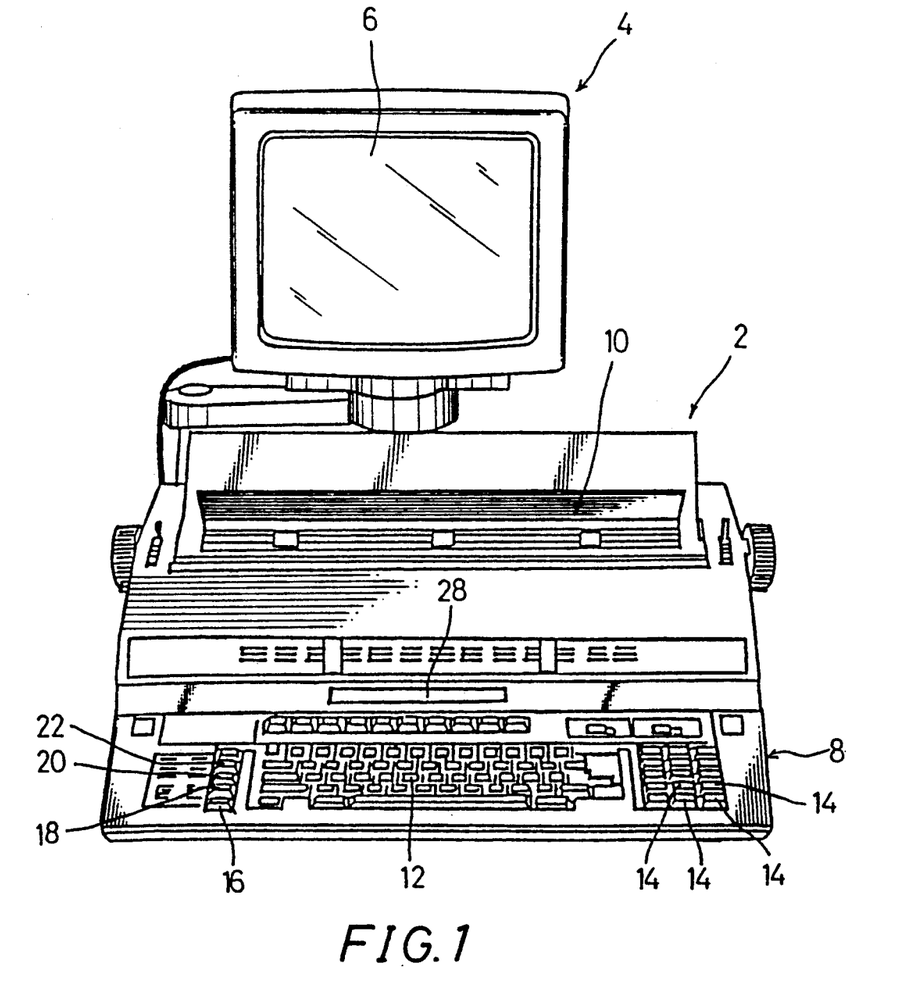
FIG. 1 is a perspective view of the frame processing system of a preferred embodiment according to the present invention.

There will now be described a preferred embodiment of the present invention with reference to FIGS. 1 to 15. Referring first to FIG. 1, the frame processing system is comprised of an electronic typewriter 2 and a CRT (cathode ray tube) display 4 as the display device of the present invention. Although the electronic typewriter 2 only may be used separately from the CRT display 4 for any purposes other than frame processing, it is utilized as an input device according to the present invention. The CRT display 4 has a screen 6 for displaying a frame, cursor, etc.

As well known, the electronic typewriter 2 is provided with a keyboard 8 as an input section and a printing mechanism 10 as a printer section. The keyboard 8 is provided with character keys 12 such as letter keys, numeral keys and symbol keys, and is also provided with various function keys such as cursor keys 14 for vertically and horizontally moving the cursor displayed on the screen 6, a frame key 16 for setting a framing mode wherein a frame is created, a frame change key 18 for setting a frame change mode wherein the frame is modified, a frame expansion key 20 for commanding expansion of the frame, and a frame contraction key 22 for commanding contraction of the frame.

The printing mechanism 10 is also well known, and details thereof are not shown. Normally, the printing mechanism 10 includes a carriage for mounting a printing head (e.g., a type wheel) which is adapted to be moved along a platen.

The electronic typewriter 2 also includes a liquid crystal display 28 having one or two horizontal lines of data. The liquid crystal display 28 is effected as a display section in the case of using the electronic typewriter 2 only.

Figure 2:
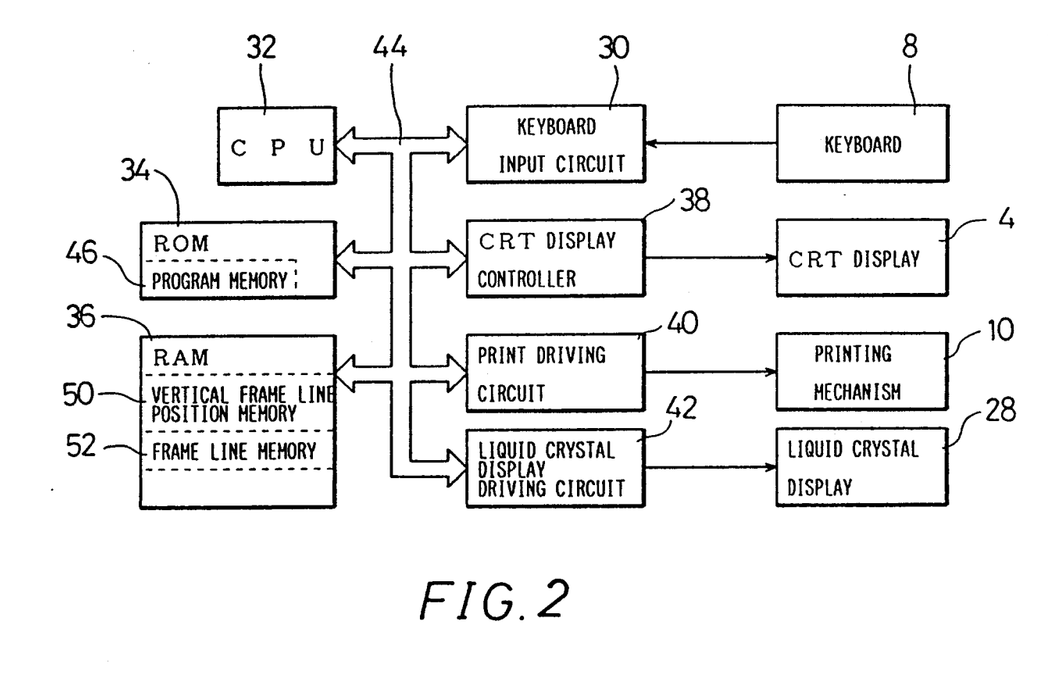
FIG. 2 is a block diagram of a control circuit for controlling the frame processing system.

The frame processing system as mentioned above is controlled by a control circuit as shown in FIG. 2. Referring to FIG. 2, the keyboard 8 is connected through a keyboard input circuit 30 to a CPU (central processing unit) 32. The CPU 32 is connected through a common bus line 44 to ROM 34, RAM 36, CRT display controller 38, print driving circuit 40 and liquid crystal display driving circuit 42.

The ROM 34 includes a program memory 46 storing various control programs for controlling the frame processing system, including a program for expansion and contraction of a frame.

The RAM 36 includes a vertical frame line position memory 50 for storing position data of vertical frame lines constituting the frame, and also includes a frame line memory 52 for storing vertical and horizontal frame line data indicative of manners of vertical and horizontal frame lines. The RAM 36 also includes a buffer, register, counter, etc.

The CRT display controller 38 is a unit for displaying a frame and a character on the screen 6, which unit is connected to the CRT display 4.

The print driving circuit 40 controls the printing mechanism 10 according to a carriage moving signal and a type selecting signal inputted from the CPU 32. The liquid crystal display driving circuit 42 controls the liquid crystal display 28.

In the framing mode, outermost frame lines of a desired frame are formed by designating two ends of a diagonal of the frame, and inside vertical and horizontal frame lines inside the frame are formed by moving the cursor.

Figure 3:
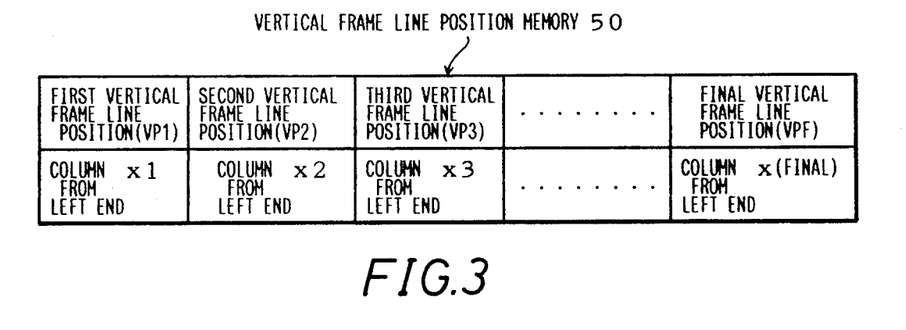
FIG. 3 is a schematic illustration of a vertical frame line position memory in the RAM shown in FIG. 2.

Referring to FIG. 3 which shows a concept of the vertical frame line position memory 50, position data of each vertical frame line of the frame is stored as a column number from a left end column (i.e., column 0) as an absolute origin, wherein one column corresponds to one character. For example, first, second and third vertical frame line position data are stored as columns X1, X2 and X3, respectively, as shown in FIG. 3. FIG. 6 shows the vertical frame line position data of the vertical line position memory 50 in an example of framing shown in FIG. 5. Referring to FIG. 6, the first, second, third and fourth vertical frame line position data are stored as columns 5, 10, 19 and 24, respectively.

Figure 4:
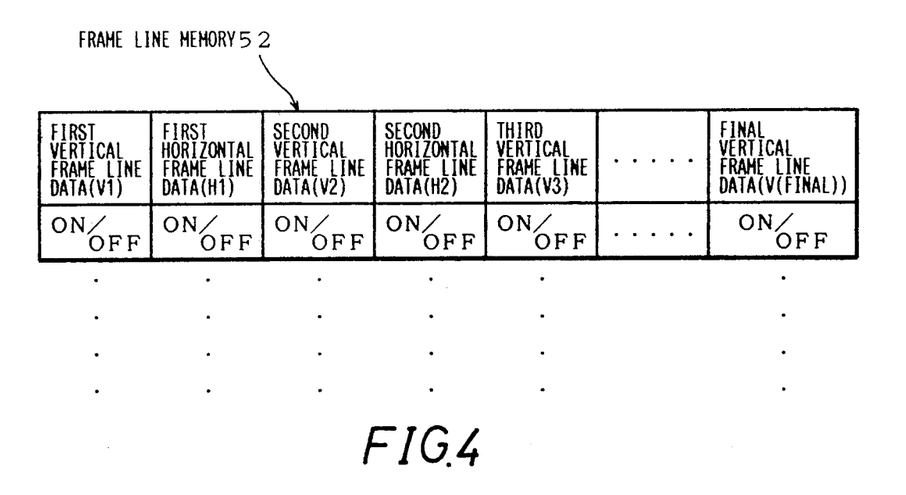
FIG. 4 is a schematic illustration of a frame line memory in the RAM shown in FIG. 2.

Referring to FIG. 4, which shows a concept of the frame line memory 52, ON/OFF data of all the vertical frame lines are stored per line, and ON/OFF data of all the horizontal frame lines are stored per line. That is, if a vertical line is present at a vertical frame line position, the data of the vertical frame line is ON, and if absent, the data is OFF. Similarly, if a horizontal line is present in an area between adjacent vertical frame line positions, the data of the horizontal frame line is ON, and if absent, the data is OFF.

Figure 5:
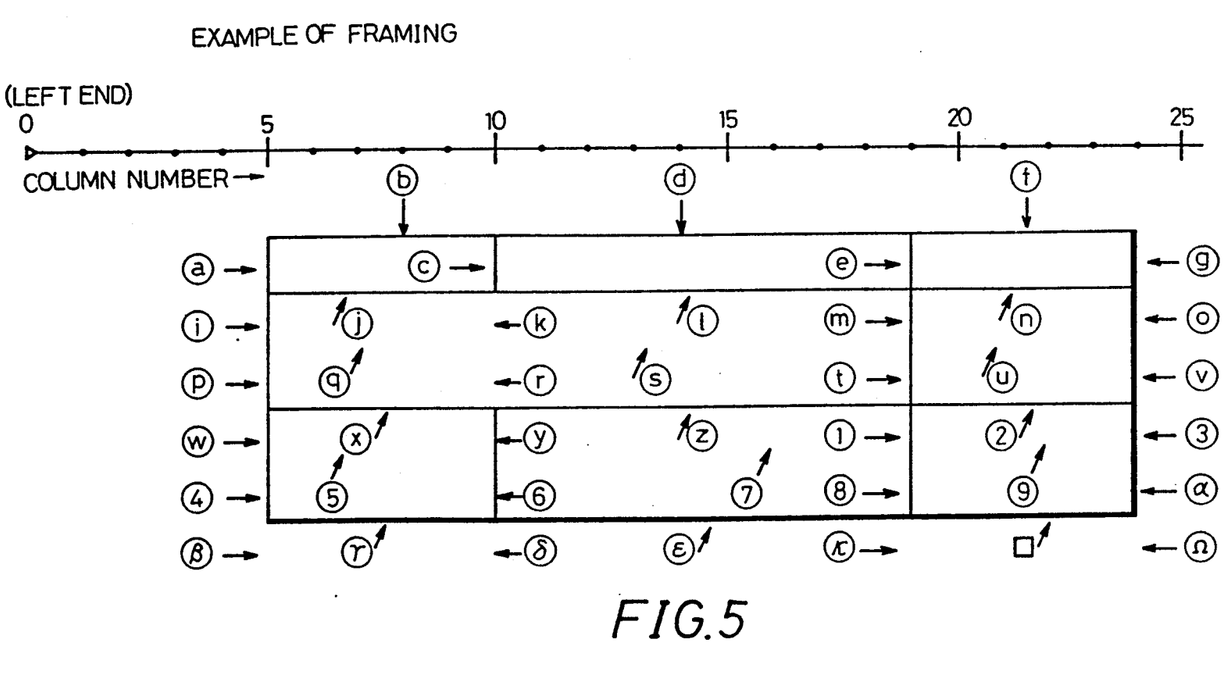
FIG. 5 is a schematic illustration of an example of framing according to the present invention.
Figure 6:
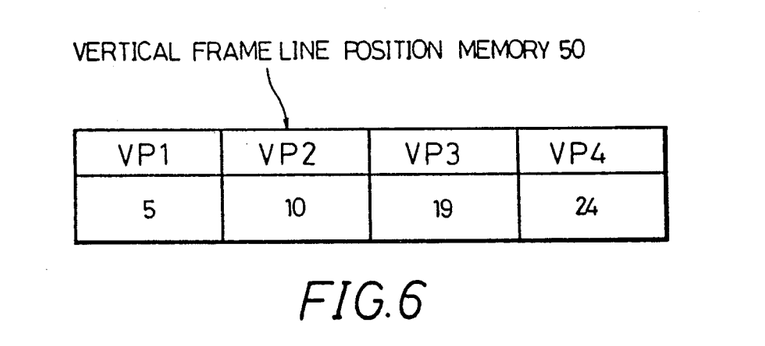
FIG. 6 is a schematic illustration of the vertical frame line position memory in the example shown in FIG. 5.
Figure 7:
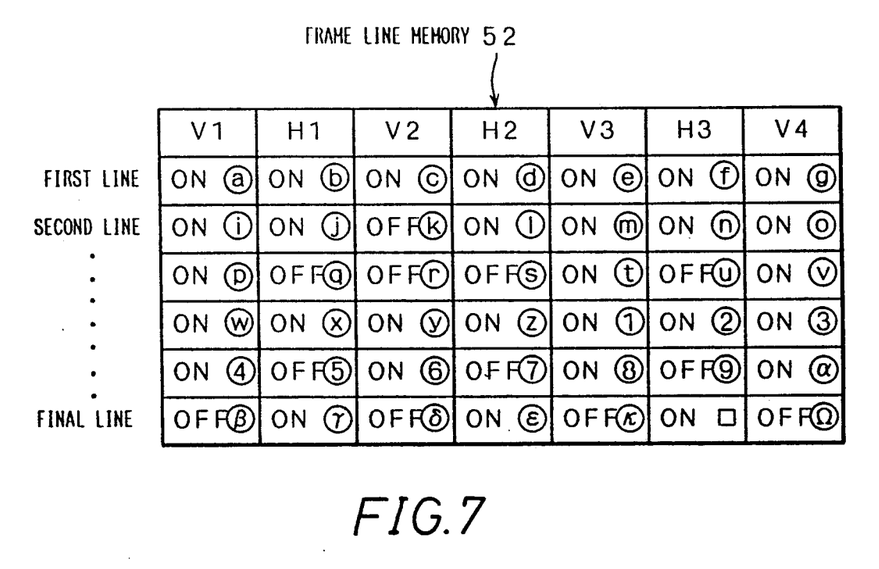
FIG. 7 is a schematic illustration of the frame line memory in the example shown in FIG. 5.

For example, referring to FIGS. 5 and 7, the first vertical frame line data V1 at the first to fifth lines are all ON, and the data V1 at the final line is OFF. The second vertical frame line data V2 at the first, fourth and fifth lines are ON, and the data V2 at the second, third and final lines are OFF.

On the other hand, as to the first horizontal frame line data H1, since horizontal lines are present between the first and second vertical lines at the first, second, fourth and final lines, the data H1 are ON, and since horizontal lines are absent at the third and fifth lines, the data H1 are OFF. In the same manner, the other frame line data V2, H2, V3, H3 and V4 are stored in the frame line memory 52.

Figure 8A:
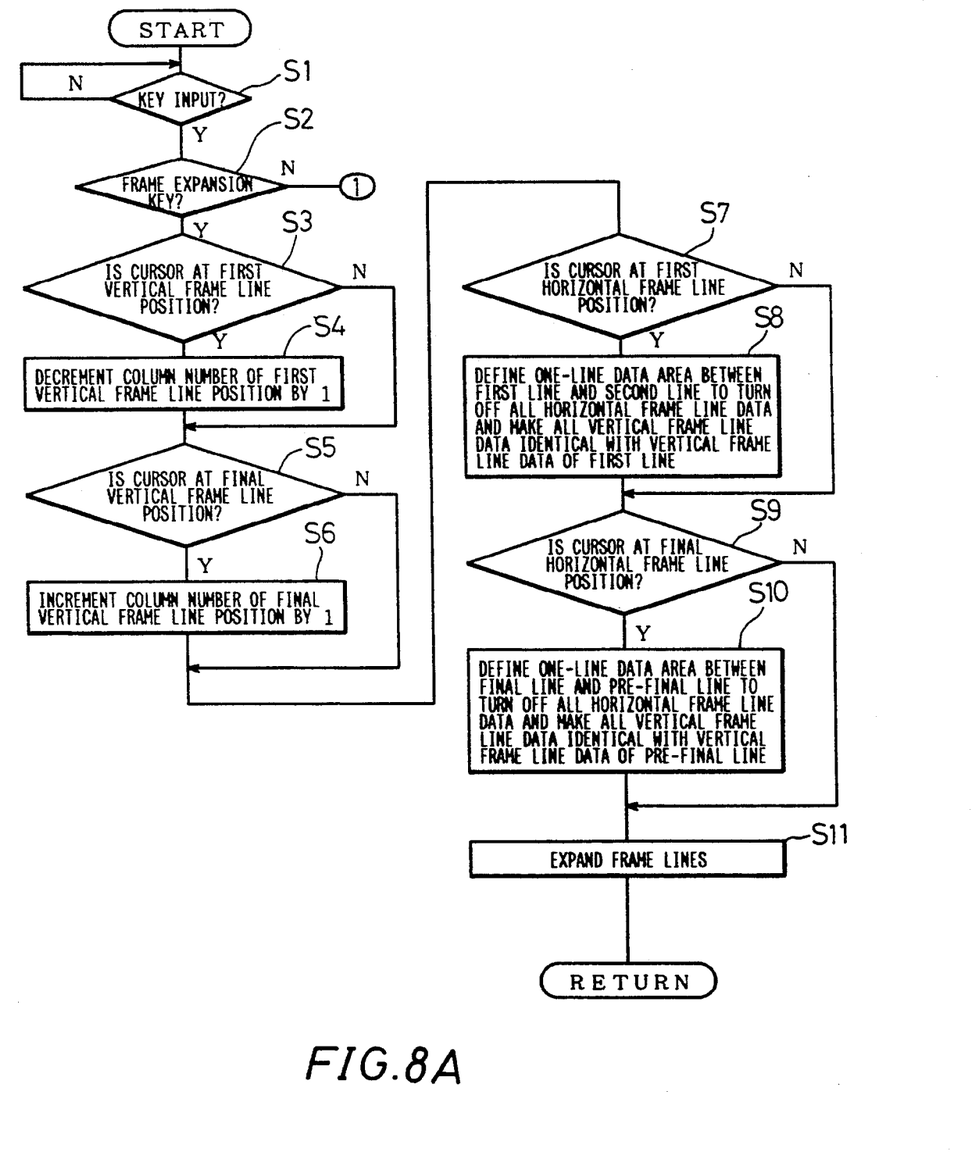
FIG. 8A is a flowchart of the program for expansion of a frame according to the present invention.

FIG. 8A shows a flowchart of the program for expanding a frame. Before starting the program, a frame line of the frame to be moved for expansion of the frame is designated by a cursor on the screen of the CRT display 4. The designation of the frame line is effected by moving the cursor to a position such that the cursor is located adjacent to the frame line to be moved.

Referring to FIG. 8A, if it is determined in step S2 that the frame expansion key 20 is depressed, the program proceeds to step S3. In step S3, it is determined whether or not the cursor is located at a first vertical frame line position (i.e., a leftmost vertical frame line position). If NO in step S3, the program proceeds to step S5 wherein it is determined whether or not the cursor is located at a final vertical frame line position (i.e., a rightmost vertical frame line position). If NO in step S5, the program proceeds to step S7 wherein it is determined whether or not the cursor is located at a first horizontal frame line (i.e., an uppermost horizontal frame line position). If NO in step S7, the program proceeds to step S9 wherein it is determined whether or not the cursor is located at a final horizontal frame line position (i.e., a lowermost horizontal frame line position). That is, in steps S3, S5, S7 and S9, it is determined what peripheral frame line is designated by the cursor for expansion of the frame.

Figure 9:
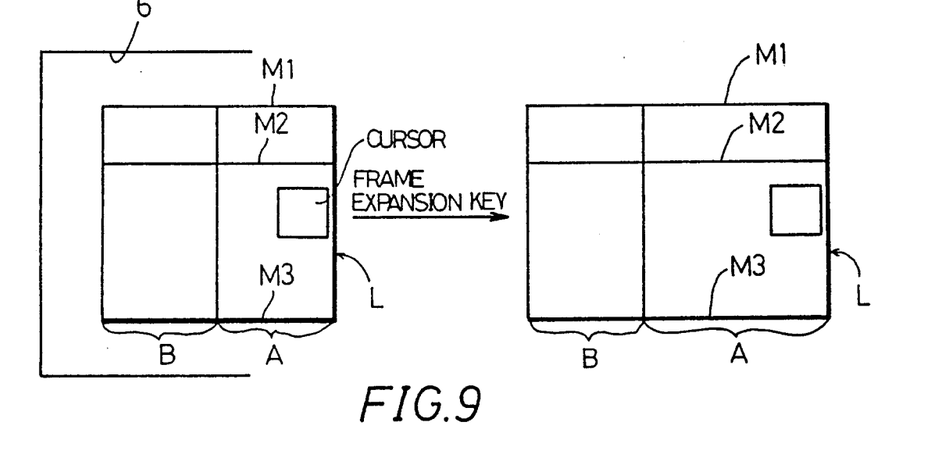
FIGS. 9, 10 and 11 are schematic illustrations of various examples of expansion of a frame in the preferred embodiment.

FIG. 9 shows an example of expansion of the frame in the case that a rightmost vertical frame line L is designated by the cursor. In this example, since the answer in step S3 is NO, the program proceeds to step S5. Since the answer in step S5 is YES, the program proceeds to step S6 wherein a column number of the final vertical frame line position stored in the vertical frame line position memory 50 is incremented by 1. That is, referring to the example shown in FIG. 6, the column number of the final (fourth) vertical frame line position is 24, and the column number 24 is incremented by 1 to obtain a column number 25. Thereafter, since the answers in step S7 and S9 are both NO, the frame is expanded rightwardly on the screen 6 of the CRT display 4.

In the above processing, the designated vertical frame line L is moved rightwardly per column in a direction perpendicular to a longitudinal direction of the designated vertical frame line L without changing a length thereof, so that an area A defined by the frame and adjacent to the designated vertical frame line L is expanded rightwardly. In association with the expansion of the area A, horizontal frame lines M1, M2 and M3 connected to the designated vertical frame line L are automatically expanded rightwardly. Moreover, an area B adjacent to the area A and not adjacent to the designated vertical frame line L is not expanded but remains still.

If the first (leftmost) vertical frame line is designated by the cursor, the answer in step S3 is YES to proceed to step S4 wherein a column number of the first vertical frame line position is decremented by 1. Thereafter, since the answers in step S5, S7 and S9 are all NO, the program proceeds to step S11 wherein the frame is expanded leftwardly.

If the final (lowermost) horizontal frame line is designated by the cursor, the answer in step S3, S5 and S7 are all NO, and accordingly the program proceeds to step S9. Since the answer in step S9 is YES, the program proceeds to step S10 wherein a one-line data area is defined between a final line and a pre-final line just before the final line, and all horizontal frame line data of the one-line data area (i.e., an update or current pre-final line) are turned off. Simultaneously, all vertical frame line data are made identical with those of the previous pre-final line.

Figure 10:
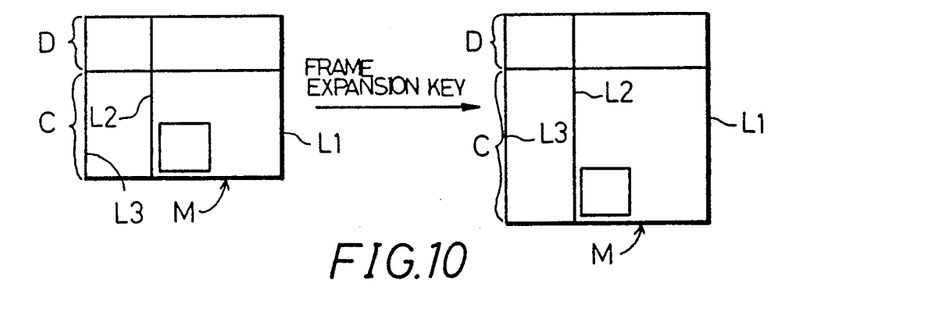

FIG. 10 shows an example of expansion of the frame in the case that a lowermost horizontal frame line M is designated by the cursor. In this example, the designated horizontal frame line M is moved downwardly per line in a direction perpendicular to a longitudinal direction of the designated horizontal frame line without changing a length thereof, so that an area C defined by the frame and adjacent to the designated horizontal frame line L is expanded downwardly. In association with the expansion of the area C, vertical frame lines L1, L2 and L3 connected to the designated horizontal frame line M are automatically expanded downwardly. Moreover, an area D adjacent to the area C and not adjacent to the designated horizontal frame line M is not expanded but remains still.

Figure 11:
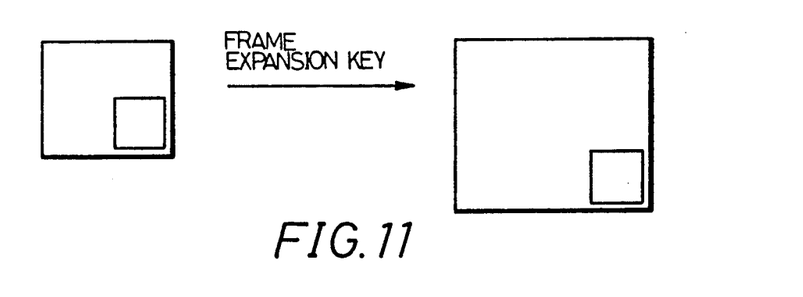

FIG. 11 shows an example of expansion of the frame in the case that both the rightmost vertical frame line and the lowermost horizontal frame line are designated by the cursor, that is, the cursor is located at a right lower corner in the frame. In this example, the answer in step S3 is NO, and the program proceeds to step S5. Since the answer in step S5 is YES, the program proceeds to step S6 where one-column rightward expansion processing for the rightmost vertical frame line is executed. Then, since the answer in step S7 is NO, the program proceeds to step S9. Next, since the answer in step S9 is YES, the program proceeds to step S10 wherein one-line downward expansion processing for the lowermost horizontal frame line is executed. As a result, in step S11, both the rightmost vertical frame line and the lowermost horizontal frame line are simultaneously moved rightwardly by one column and downwardly by one line, respectively, thus expanding the frame two-dimensionally.

Figure 8B:
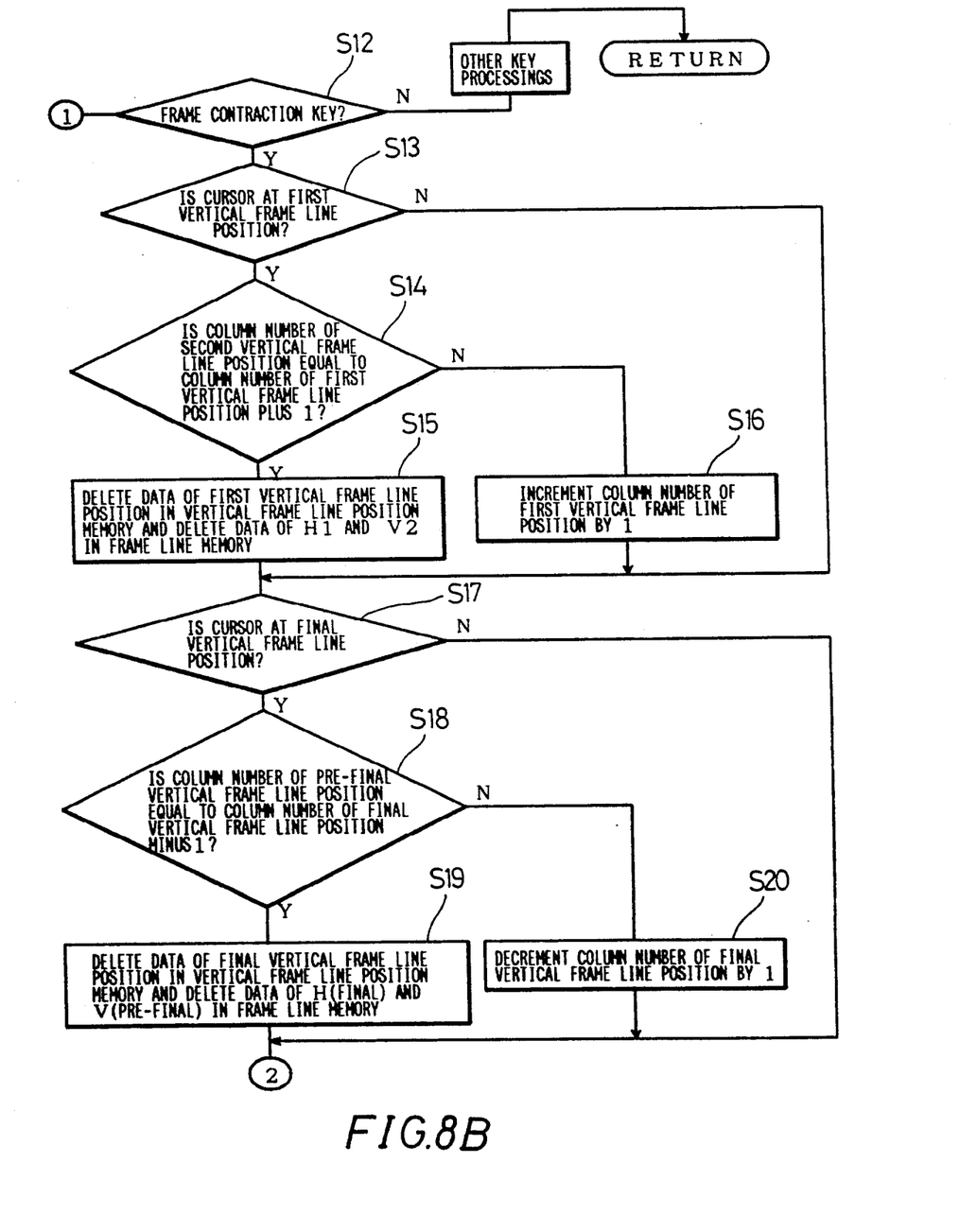
FIGS. 8B and 8C are flowcharts of the program for contraction of a frame according to the present invention.
Figure 8C:
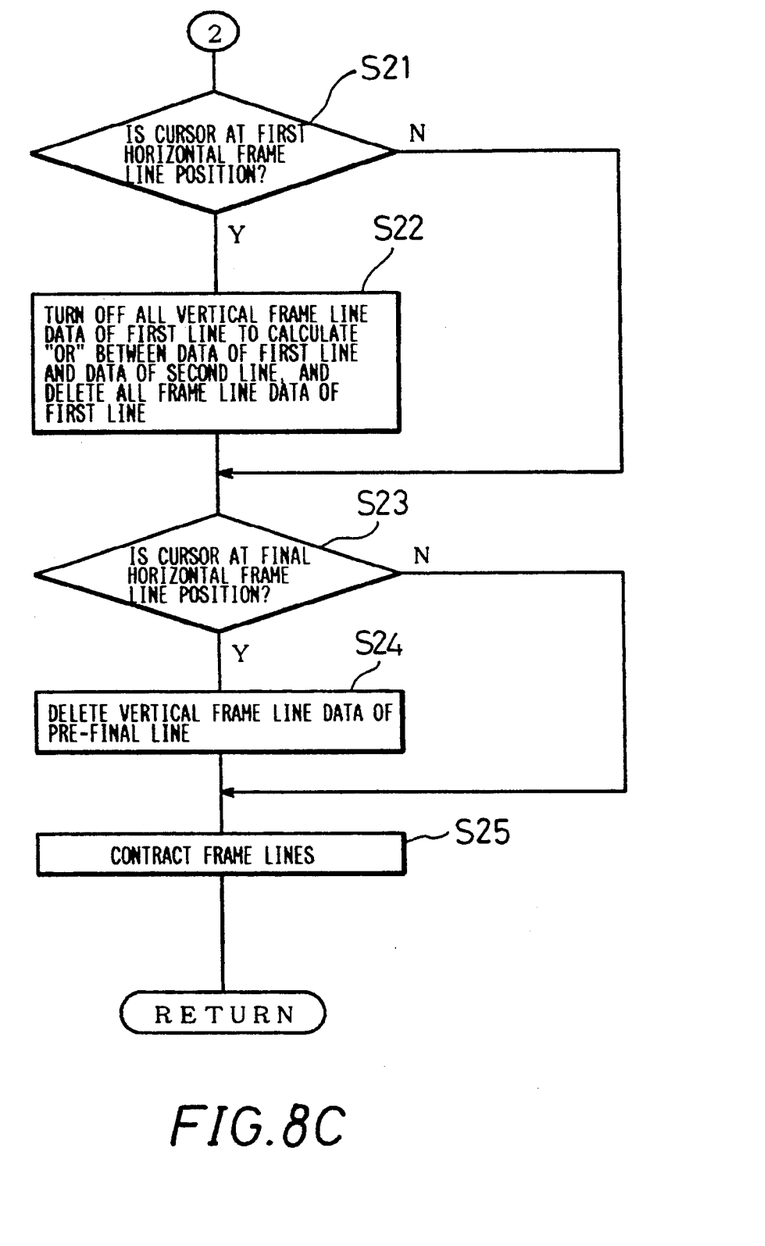

FIGS. 8B and 8C show a flowchart of the program for contracting a frame. Before starting the program, a frame line of the frame to be moved for contraction of the frame is designated by the cursor.

In the same manner as in FIG. 8A, it is determined in steps S13, S17, S21 and S23 what peripheral frame line is designated by the cursor for contraction of the frame.

Figure 12:
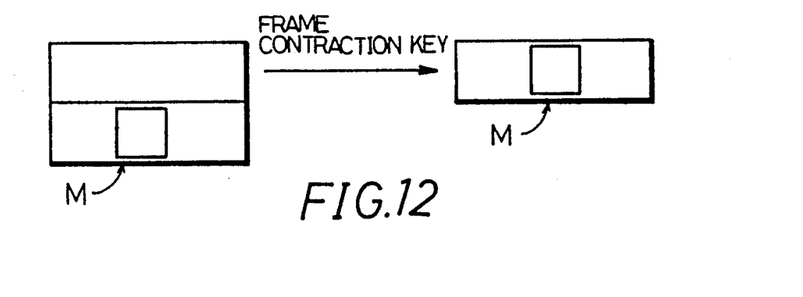
FIGS. 12, 13, 14 and 15 are schematic illustrations of various examples of contraction of a frame in the preferred embodiment.

FIG. 12 shows an example of contraction of the frame in the case that the lowermost horizontal frame line M is designated by the cursor. In this example, the answer in step S2 shown in FIG. 8A is NO, and the program proceeds to step S12 shown in FIG. 8B. Since the answer in step S12 is YES, the program proceeds to step S13. Then, since the answer in step S13 is NO, and the answers in the subsequent steps S17 and S21 are both NO, the program proceeds to step S23. Next, since the answer in step S23 is YES, the program proceeds to step S24 wherein all vertical frame line data of the pre-final line just before the final (lowermost) line are deleted or turned off. For example, referring to FIG. 7, the ON/OFF data of the vertical frame line data V1, V2, V3 and V4 of the pre-final line are all deleted or turned off, and the vertical frame line data of the final line are shifted to the previous pre-final line data. Thereafter, the program proceeds to step S25 wherein the frame is contracted upwardly by one line as shown in FIG. 12.

Figure 15:
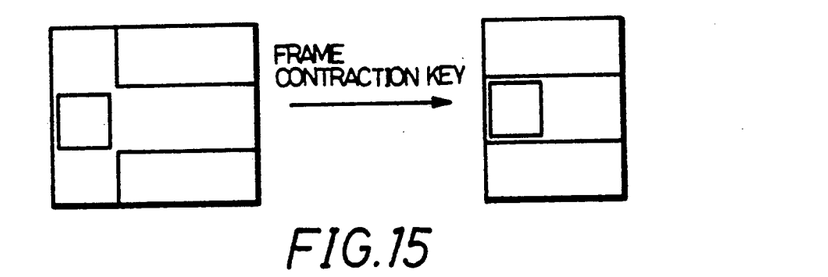

FIG. 15 shows an example of contraction of the frame in the case that the one-column rightward contraction of the frame by the one-column rightward movement of the first (leftmost) vertical frame line results in superimposition between the first vertical frame line and the second vertical frame line. In this example, since the answer in step S13 is YES, the program proceeds to step S14. Then, it is determined in step S14 whether or not the column number of the second vertical frame line position is equal to the column number of the first vertical frame line position plus 1. Since the answer in step S14 is YES in this example, the program proceeds to step S15 wherein the data of the first vertical frame line position in the vertical frame line position memory 50 is deleted, and the data of the first horizontal frame line H1 and the second vertical frame line V2 in the frame line memory 52 are all deleted. For example, referring to FIGS. 6 and 7, the column "5" of the first vertical frame line position in the vertical frame line position memory 50 as shown in FIG. 6 is deleted, and all the data H1 and V2 in the frame line memory 52 as shown in FIG. 7 are deleted. Since the data of H1 remains valid, and are substituted for the data of V2. Thereafter, in step S25, the frame is contracted rightwardly by one column as shown in FIG. 15.

If the answer in step S14 is NO, the program proceeds to step S16 wherein the column number of the first vertical frame line position is incremented by 1.

As to steps S17, S18, S19 and S20, substantially the same processings as those in the above-mentioned steps S13, S14, S15 and S16 are executed with the exception that the final (rightmost) vertical frame line rather than the first (leftmost) vertical frame line is designated.

In the case that the first (uppermost) horizontal frame line is designated, the answer in step S21 is YES, and the program proceeds to step S22 where all vertical frame line data of the first line are turned off, and "OR" between data of the first line and data of the second line are calculated to delete all frame line data of the first line. For example, referring to FIG. 7, the vertical frame line data V1, V2, V3 and V4 of the first line are all deleted, and "OR" between all the ON/OFF data of the first line and all the ON/OFF data of the second line are calculated. That is, as all the vertical frame line data of the first line are deleted, the vertical frame line data of the second line remains still. As to the horizontal frame line data of the second line, unless the horizontal frame line data H1, H2 and H3 of the first line and the second line are both OFF, the horizontal frame line data of the second line are changed into ON. Then, the horizontal frame line data of the first line are deleted. Thereafter, the program skips step S24 to proceed to step S25 wherein the frame is contracted downwardly.

Figure 13:
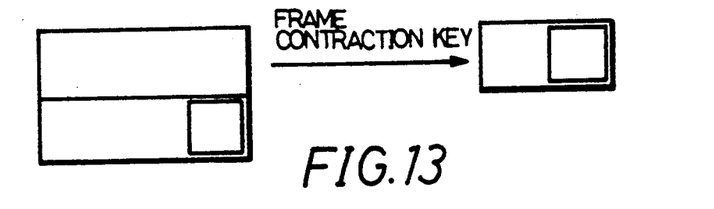

FIG. 13 shows an example of contraction of the frame in the case that the cursor is located at a right lower corner in the frame. In this example, since the answer in step S17 is YES, and the answer in step S18 is NO, the step S20 is executed, and since the answer in step S23 is YES, the step S24 is executed. As a result, the execution of step S25 results in a manner of contraction as shown in FIG. 13.

Figure 14:
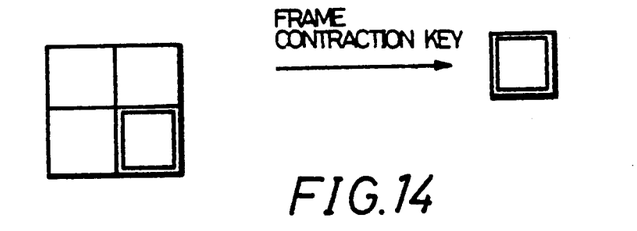

Similarly, in an example shown in FIG. 14, since the answer in step S18 is YES, the step S19 is executed, and since the answer in step S23 is YES, the step S24 is executed. As a result, the execution of step S25 results in a manner of contraction as shown in FIG. 14.

As shown in FIGS. 13 and 14, the vertical and horizontal frame lines are leftwardly by one column and upwardly by one line simultaneously, thus contracting the frame two-dimensionally.

The frame line designating means in the above- (-) mentioned preferred embodiment is constituted of the cursor to be displayed on the CRT display 4, the cursor keys 14 for moving the cursor, and the CPU 32 for executing the processing for designation of the frame line. The frame expansion/contraction commanding means is constituted of the frame expansion key 20, the frame contraction key 22 and the CPU 32 for executing the processings for expansion and contraction of the frame line. The expansion/contraction processing means is constituted of a memory area of the program memory 46 that stores the steps S2–S11 and S12–S25, and the CPU 32 for executing these steps.

Although the frame line to be moved for expansion or contraction of the frame includes all the outermost vertical and horizontal frame lines in the above-mentioned preferred embodiment, the above program may be modified in such a manner that the upper horizontal frame line and the leftmost vertical frame line are fixed, and the lowermost horizontal frame line and the rightmost vertical frame line are moved.

Figure 16:
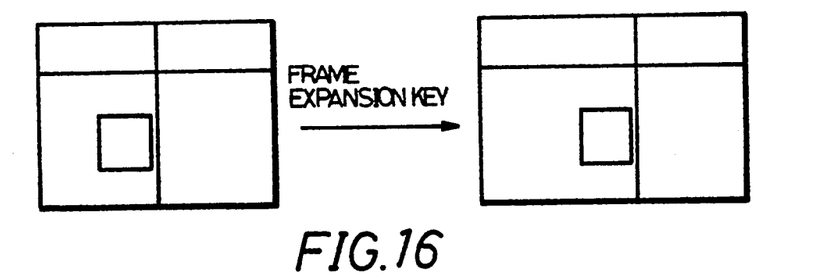
FIGS. 16 and 17 are schematic illustrations of other examples of expansion and contraction of a frame, respectively, according to the present invention.
Figure 17:
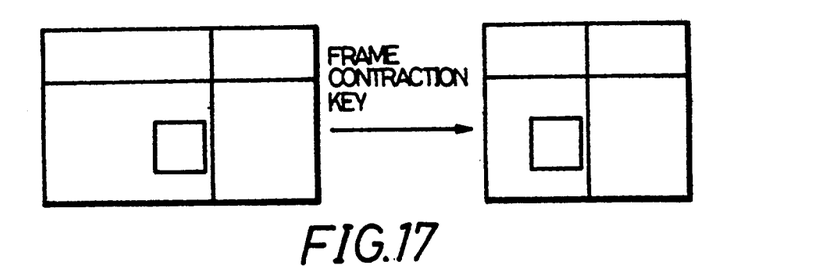

Further, the frame line to be moved for expansion or contraction of the frame is not limited to the outermost vertical and horizontal frame lines, but inside vertical and horizontal frame lines formed inside the frame may be designated by the cursor as shown in FIGS. 16 and 17.

Additionally, the direction of movement of the frame line is not limited to the direction perpendicular to the longitudinal direction of the frame line, but the frame line may be moved in any other directions.

Having thus described the preferred embodiment of the invention, it should be understood that numerous structural modifications and adaptations may be made without departing from the spirit of the invention.

What is claimed is:

1. A frame processing system for an electronic word processing system capable of expanding and contracting a matrix-like defined table frame having a plurality of vertical and horizontal lines defined by the same line creating mode to define a plurality of areas, comprising:
    a display device having a screen for displaying said table frame;
    table frame expansion/contraction commanding means operable during a data input mode for selectively commanding one of expansion and contraction of said table frame in one direction from a group of directions consisting of vertical, horizontal and both simultaneously;
    frame line designating means operable during the data input mode for designating at least one of said vertical and horizontal frame lines as a designated frame line to be moved on said screen for said one of expansion and contraction of said table frame; and
    expansion/contraction processing means for parallelly moving said at least one designated frame line in a direction different from a longitudinal direction of said at least one designated frame line when a command for said one of expansion and contraction of said frame is supplied from said table frame expansion/contraction commanding means to said expansion/contraction processing means, wherein when the command for expansion is supplied, all of said areas defined between a first frame line of said at least one designated frame line running in a one of the vertical and horizontal directions and an adjacent frame line parallel to said first frame line are expanded in a first direction in such a manner that all frame lines transversely connected to said first frame line are expanded in said first direction to maintain connection therebetween without expanding any areas not defined by said first frame line, while when the command for contraction is supplied, all of said areas defined between said first frame line and an adjacent frame line parallel to said first frame line are contracted in a second direction in such a manner that all frame lines transversely connected to said designated frame line are contracted in said second direction to maintain connection therebetween without contracting any areas not defined by said first frame line, wherein a second frame line of said at least one designated frame line can also be one of expanded in a third direction and contracted in a fourth direction in an action corresponding to expansion and contraction of said first frame line such that only areas defined by at least one of said first frame line and said second frame line are respectively expanded and contracted and so to are all frame lines transverse to each said frame line being expanded or contracted.

2. The frame processing system is defined in claim 1, wherein said expansion/contraction processing means moves said at least one designated frame line a selected one of column and line in a direction perpendicular to the longitudinal direction of said at least one designated frame line.

3. The frame processing system as defined in claim 1, wherein said table frame expansion/contraction commanding means comprises a frame expansion key for commanding expansion of said table frame and a table frame contraction key for commanding contraction of said table frame.

4. The frame processing system is defined in claim 1, wherein said frame line designating means comprises a cursor to be displayed on said screen, said cursor being positioned adjacent to said at least one designated frame line and being moved together with said at least one designated frame line.

5. The frame processing system as defined in claim 1, wherein said expansion/contraction processing means comprises a central processing unit, a ROM including a program memory storing a control program which controls expansion and contraction of said table frame, and a RAM including a vertical table frame line position memory means for storing position data of vertical frame lines constituting said table frame and a table frame line memory means for storing vertical and horizontal frame line data indicative of orientation of vertical and horizontal frame lines.

6. The frame processing system as defined in claim 5, wherein said position data of said vertical frame lines to be stored in said vertical frame line position memory are column numbers counted from an absolute origin.

7. The frame processing system as defined in claim 6, wherein said vertical and horizontal frame line data to be stored in said frame line memory means are ON/OFF data of all the vertical frame lines to be stored per line and ON/OFF data of all the horizontal frame lines to be stored per area defined between the adjacent vertical lines in such a manner that if the vertical frame lines and the horizontal frame lines are present, the data is ON, while if absent, the data is OFF.

8. A frame processing system for an electronic word processing system capable of expanding and contracting a matrix-like defined table frame to be printed having a plurality of frame lines stored in a memory wherein each frame line corresponds to characters to be printed to define an area, comprising:

a display device having a screen for displaying said table frame;

table frame expansion/contraction commanding means operable during a data input mode for selectively commanding one of expansion and contraction of said table frame;

table frame line designating means for designating at least one of said frame lines as a designated frame line to be moved on said screen for said one of expansion and contraction of said table frame; and expansion/contraction processing means for parallelly moving said designated frame line in a direction different from a longitudinal direction of said designated frame line without changing a length of said designated frame line when a command for said one of expansion and contraction is supplied from said table frame expansion/contraction commanding means to said expansion/contraction processing means, wherein when the command for expansion is supplied, all frame lines connected to said designated frame line are expanded so as to expand an area inside said table frame and adjacent to said designated frame line, while when the command for contraction is supplied, all frame lines connected to said designated frame line are contracted so as to contract an area inside said frame line and adjacent to said designated frame line, wherein a second designated frame line of said at least one of said frame lines can also be one of expanded and contracted in an action corresponding to expansion and contraction of said designated frame line such that only areas defined by at least one of said designated frame line and said second designated frame line are respectively expanded and contracted and so to are all frame lines transverse to said second designated frame line in a manner identical to that of said designated frame line, said expansion/contraction processing means comprising a central processing unit, a ROM including a program memory storing a control program which controls expansion and contraction of said frame, and a RAM including a vertical frame line position memory means for storing position data of vertical frame lines constituting said frame and a frame line memory means for storing vertical and horizontal frame line data indicative of orientation of vertical and horizontal frame lines.

9. The frame processing system as defined in claim 8, wherein said position data of said vertical frame lines to be stored in said vertical frame line position memory means are column numbers counted from an absolute origin.

10. The frame processing system as defined in claim 8, wherein said vertical and horizontal frame line data to be stored in said frame line memory means are ON/OFF data of all the vertical frame lines to be stored per line and ON/OFF data of all the horizontal frame lines to be stored per area defined between the adjacent vertical lines in such a manner that if the vertical frame lines and the horizontal frame lines are present, the data is ON, while if absent, the data is OFF.

11. The frame processing system as defined in claim 8, wherein said control program stored in said program memory includes an expansion processing means for expanding said table frame, a contraction processing means for contracting said table frame, and a means for determining which of said frame lines is designated by said table frame line designating means.

12. A frame processing system for an electronic word processing system capable of expanding and contracting a matrix-like defined table frame to be printed having a plurality of frame lines stored in a memory wherein each frame line corresponds to characters to be printed to define an area, comprising:

a display device having a screen for displaying said table frame;

table frame expansion/contraction commanding means operable during a data input mode for selectively commanding one of expansion and contraction of said table frame;

a cursor means operable during the data input mode for designating at least one of said frame lines as a designated frame line to be moved on said screen for said one of expansion and contraction of said frame, said cursor means being positioned adjacent to at least one of said frame lines to be designated and being moved together with said designated frame line; and expansion/contraction processing means for parallelly moving said designated frame line in a direction different from a longitudinal direction of said designated frame line without changing a length of said designated frame line when a command for said one of expansion and contraction of said frame is supplied from said table frame expansion/contraction commanding means to said expansion/contraction processing means, wherein when the command for expansion is supplied, all frame lines connected to said designated frame line are expanded so as to expand an area inside said frame and adjacent to said designated frame line, while when the command for contraction is supplied, all frame lines connected to said designated frame line are contracted so as to contract an area inside said frame and adjacent to said designated frame line, wherein said cursor means may be positioned adjacent a second designated frame line and said second designated frame line can also be one of expanded and contracted in an action corresponding to expansion and contraction of said designated frame line such that only areas defined by at least one of said designated frame line and said second designated frame line are respectively expanded and contracted and so to are frame lines transverse to each of said designated frame line and said second designated frame line.

* * * * *